United States Patent
Ciprari et al.

(10) Patent No.: US 11,721,069 B2
(45) Date of Patent: Aug. 8, 2023

(54) PROCESSING OF 2D IMAGES TO GENERATE 3D DIGITAL REPRESENTATIONS FROM WHICH ACCURATE BUILDING ELEMENT MEASUREMENT INFORMATION CAN BE EXTRACTED

(71) Applicant: Pointivo, Inc., Atlanta, GA (US)

(72) Inventors: Daniel L. Ciprari, Atlanta, GA (US); Habib Fathi, Atlanta, GA (US)

(73) Assignee: POINTIVO, INC., Atlanta, GA (US)

( * ) Notice: Subject to any disclaimer, the term of this patent is extended or adjusted under 35 U.S.C. 154(b) by 322 days.

(21) Appl. No.: 16/693,023

(22) Filed: Nov. 22, 2019

(65) Prior Publication Data

US 2020/0111254 A1 Apr. 9, 2020

Related U.S. Application Data

(63) Continuation of application No. 15/134,310, filed on Apr. 20, 2016, now abandoned, which is a
(Continued)

(51) Int. Cl.
*G06T 17/20* (2006.01)
*G06T 17/05* (2011.01)

(52) U.S. Cl.
CPC .............. *G06T 17/20* (2013.01); *G06T 17/05* (2013.01); *G06T 2210/04* (2013.01)

(58) Field of Classification Search
CPC ........ G06T 7/20; G06T 17/05; G06T 2210/04
See application file for complete search history.

(56) References Cited

U.S. PATENT DOCUMENTS 3,607,550 A * 9/1971 Ballanger ............... B31B 70/00
156/358
5,824,892 A * 10/1998 Ishii ........................ G01F 17/00
73/149

(Continued)

OTHER PUBLICATIONS

Fathi, H.,"Videogrammetric Roof Surveying Using a Hybrid Structure from Motion Approach", GA Institute of Technology(Dec. 2013)URL:https://smartech.gatech.edu/bitstream/handle/1853/52972/FATHI-DISSERTATION-2013.pdf?sequence=1&isAllowed=y.

(Continued)

*Primary Examiner* — Joseph Suh
(74) *Attorney, Agent, or Firm* — Thomas | Horstemeyer, LLP

(57) ABSTRACT

Various examples are provided related to generation of accurate measurement information for a structure including a building of interest. A single passive image capture device (e.g., handheld devices such as cellular telephones and tablets) can generate two-dimensional (2D) images that overlap with regard to a building element of interest. Processing the 2D images can generate a three-dimensional (3D) digital representation from which accurate building element measurement information can be extracted. The extracted information can be used in applications such as construction/remodeling estimation, 3D model generation, insurance policy underwriting and adjusting, interior design efforts, landscaping, real estate marketing, inventory management and other areas where it can be desirable to obtain information about features and dimensions of one or more features or objects present in the location.

12 Claims, 4 Drawing Sheets

Related U.S. Application Data continuation-in-part of application No. PCT/US2015/056752, filed on Oct. 21, 2015.

(60) Provisional application No. 62/165,995, filed on May 24, 2015.

(56) References Cited

U.S. PATENT DOCUMENTS

| | | | | |
|---|---|---|---|---|
| 5,936,862 | A * | 8/1999 | Wong | G06T 17/00 248/459 |
| 6,640,002 | B1 * | 10/2003 | Kawada | G06T 7/0004 348/87 |
| 6,947,076 | B1 * | 9/2005 | Kitaguchi | H04N 5/232 348/218.1 |
| 7,277,572 | B2 | 10/2007 | MacLnnes et al. | |
| 2004/0193223 | A1 * | 9/2004 | Kramer | A61N 1/36843 607/9 |
| 2005/0257748 | A1 * | 11/2005 | Kriesel | A01K 29/00 119/51.02 |
| 2006/0075718 | A1 * | 4/2006 | Borne | G06F 30/13 52/745.02 |
| 2006/0293839 | A1 * | 12/2006 | Stankieiwcz | G01C 21/20 701/434 |
| 2008/0275166 | A1 * | 11/2008 | Becker | C08F 299/065 524/5 |
| 2009/0099457 | A1 * | 4/2009 | Barnes | G16H 30/20 600/476 |
| 2009/0240730 | A1 * | 9/2009 | Wood | G06F 16/289 |
| 2009/0269445 | A1 * | 10/2009 | Borgstedt | B01J 13/10 426/92 |
| 2012/0184398 | A1 * | 7/2012 | Ikka | A63B 69/3685 473/407 |
| 2012/0197600 | A1 * | 8/2012 | Bai | G06T 17/00 703/1 |
| 2012/0316913 | A1 * | 12/2012 | Reyes | G06Q 50/08 705/7.23 |
| 2013/0090612 | A1 * | 4/2013 | de Juan, Jr. | A61K 9/0051 604/300 |
| 2013/0141565 | A1 * | 6/2013 | Ling | G01C 21/3602 348/135 |
| 2013/0162775 | A1 * | 6/2013 | Baumann | G01S 17/86 348/45 |
| 2013/0238379 | A1 * | 9/2013 | Prieto | G06Q 10/06313 705/7.23 |
| 2013/0266579 | A1 * | 10/2013 | Wei | A61P 25/00 424/158.1 |
| 2014/0063512 | A1 * | 3/2014 | Takeuchi | G06F 3/1252 358/1.2 |
| 2014/0200863 | A1 * | 7/2014 | Kamat | G06T 19/00 703/1 |
| 2014/0267633 | A1 * | 9/2014 | Venkataraman | G01P 3/38 348/48 |
| 2014/0268145 | A1 * | 9/2014 | Lane | G01F 17/00 356/364 |
| 2014/0270480 | A1 * | 9/2014 | Boardman | G06T 11/206 382/154 |
| 2015/0160340 | A1 * | 6/2015 | Grauer | G01S 17/50 356/5.04 |
| 2015/0276379 | A1 * | 10/2015 | Ni | G06T 7/564 382/154 |
| 2016/0044301 | A1 * | 2/2016 | Jovanovich | H04N 13/221 348/50 |
| 2016/0073229 | A1 * | 3/2016 | Haro | H04W 4/021 455/456.3 |
| 2016/0163066 | A1 * | 6/2016 | Ishihara | G06K 9/4661 382/162 |
| 2016/0258256 | A1 * | 9/2016 | Nguyen | B22F 3/10 |
| 2016/0299569 | A1 * | 10/2016 | Fisher | G02B 27/0172 |
| 2016/0380177 | A1 * | 12/2016 | Ebigase | H01L 41/0973 310/328 |
| 2017/0037944 | A1 * | 2/2017 | Jaekel | F16H 55/08 |
| 2018/0129871 | A1 * | 5/2018 | Song | G06K 9/00892 |
| 2018/0231370 | A1 * | 8/2018 | Durand De Gevigney | G01N 21/8806 |

OTHER PUBLICATIONS

Hilsenbeck, S., et al., "Scale-preserving long-term visual odometry for indoor navigation", Indoor Positioning and Indoor Navigation (IPIN), 2012 International Conference on, IEEE (Nov. 2012) pp. 1-10; DOI: 10.1109/IPIN.2012.6418934.

Wohler, C., et al.,"Monocular 3D scene reconstruction at absolute scale" ISPRS Journal of Photogrammetry and Remote Sensing, vol. 64, No. 6 (Nov. 2009)pp. 529-540.

European Patent Application EP1582327.4 filed on Oct. 21, 2015, Supplemental European Search Report dated Sep. 18, 2017.

\* cited by examiner

PROCESSING OF 2D IMAGES TO GENERATE 3D DIGITAL REPRESENTATIONS FROM WHICH ACCURATE BUILDING ELEMENT MEASUREMENT INFORMATION CAN BE EXTRACTED

CROSS-REFERENCE TO RELATED APPLICATIONS

This application claims priority to, and the benefit of, U.S. Non-Provisional application Ser. No. 15/134,310, filed Apr. 20, 2016 and entitled "Surveying and Measurement Methods and Devices," which claims priority to U.S. Provisional Application No. 62/165,995, filed May 24, 2015, and also claims priority to PCT Application No. PCT/US15/56752, filed Oct. 21, 2015. The disclosures of each of these applications are incorporated herein by reference in their entireties.

FIELD OF THE INVENTION

The present invention relates to devices and methods for generating surveys of interior and exterior locations using image capture devices associated with image processing techniques suitable to allow survey and measurement information and where such survey and measurement information can optionally be further processed. Such survey and measurement information can be used in applications such as construction/remodeling estimation, 3D model generation, insurance policy underwriting and adjusting, interior design efforts, landscaping, real estate marketing, inventory management and other areas where it can be desirable to obtain information about features and dimensions of one or more features or objects present in the location.

BACKGROUND OF THE INVENTION

The generation of accurate interior and exterior scene reconstructions from images has been an active area of computer vision research that has experienced significant advances in the last several years. However, most of the recent work in the image reconstruction field has focused on outdoor scenes taken from elevations, such as those provided by drones or other aerial sources. Examples of such aerial exterior scenes for surveying roofs and developing information therefrom are described in U.S. Pat. Nos. 8,670,961, 9,070,018 and 9,129,376, the disclosures of which are incorporated by reference.

In contrast to indoor scenes generally and outdoor scenes not taken from elevated vantage points, outdoor scenes taken from elevated locations are generally less noisy, exhibit less variation in illumination intensity, present fewer untextured areas and narrower baselines. Image reconstruction using aerial scenes, therefore, generally results in fewer errors in comparison to those obtained when using the same methods to generate indoor scenes and ground level exterior scenes. This means that some methods that use computer vision to generate aerial survey and measurement information using computer vision have been developed, whereas comparable improvements in generating interior and non-aerial surveys/non-aerial exterior scenes has lagged.

Imaging of interior and ground level (or substantially ground level) exterior scenes to generate data for accurate scene reconstructions using existing methodologies provides additional difficulties in extracting detail therefrom. For example, indoor environments often contain clutter, such as lamps, desks, chairs, etc., that can serve to hide the useful architectural lines of the room. Furthermore, reconstructing a floorplan or extracting information requiring measurement accuracy from datasets derived from images of interior scenes can typically include large degrees of variability and ambiguity (e.g., noisy data), each of which makes it problematic to generate survey-quality information using such images. Lighting can also be problematic. Comparably, outdoor scenes at ground level often comprise aspects that will serve to clutter the view and make it difficult to resolve various salient details from the scene. For example, landscaping (e.g., bushes, trees etc.) will often obscure details regarding a structure in need of surveying or measurement. In areas where structures are located close together, it can be more difficult to extract features associated specifically with the structure of interest from images taken at ground level or thereabouts, whereas when aerial views of those same structures will demonstrate distinctions between the roofs that will generally allow the individual structures to be identified from above.

Because of the difficulties in generating accurate scene reconstructions of interior scenes and ground level exterior scenes using existing computer vision methods, information regarding many interior and exterior scenes are often still mainly generated primarily by hand.

In regards to interior and non-aerial exterior surveys, measurements are taken of the relevant dimensions of a room (or other interior location) with a tape measure or laser scanning device and those measurements are recorded for later use in a floorplan or the like as spreadsheet data. A digitizing pad can also be used to capture the data when connected to a laser scanning device equipped with Bluetooth connectivity. However, a physical measurement capture step is still required, even though the data capture step itself may be faster. In short, whether conducted by physically measuring the space with a measuring tape or a laser scanning tool, the measurement aspect of the process takes considerable time and at least some degree of experience in measurement to ensure that accurate data is obtained.

Similarly, in regards to exterior scenes, dimensions of an exterior location are taken by hand or with a laser scanner. However, features regarding specific attributes of a building exterior, such as doors, windows etc., will still need to be generated by hand. Those features might then be combined with information extracted from a photograph to create a survey plot.

Recently, some products have emerged that purport to reduce the need for a physical measurement step in order to obtain floorplans, exterior surveys and the like. However, to date, these products require specialized hardware to be integrated into a hardware device, such as by the addition of a depth-sensing camera into an Android device in conjunction with Google's Project Tango or Structure.io. When coupled with the appropriate software interfaces, these products purport to allow measurements to be obtained using the devices. Images can be obtained using non-specialized hardware (e.g., the native cameras on a smartphone or tablet), however, substantial post-processing is required to enable accurate measurements to be suitably obtained from such images, if measurements are obtainable at all.

For newer buildings, measurements can be generated directly from computerized drawings, CADs or building information models ("BIM"). The number of building locations that do not comprise computerized renderings from which measurements can be derived far surpasses the number of buildings for which computerized renderings exist, however.

There remains a need for simplified methods to obtain accurate measurements taken of interior and exterior locations, especially in regards to such measurements being usable to generate information useful to create takeoffs, construction estimations and the like. In this regard, it is desirable to be able to generate accurate information regarding features and dimensions of one or a plurality of building elements located on the interior of buildings (e.g., floors, walls, ceilings, doors, fixtures, shelving, items or objects included therein) from images of the locations without the need for specialized hardware or post-processing steps. It would be further desirable for such information to be suitable for use in construction estimation hardware, construction/remodeling estimation, site plan generation, architectural drawing generation, insurance policy underwriting and adjusting, interior design efforts, landscaping, real estate marketing, 3D model generation, inventory management and other applications. Moreover, it would be highly desirable to generate such accurate measurements using simplified methodology that is accessible to a wide-variety of users, including those with little to no training or skills in surveying and/or computer vision techniques. The present invention provides this and other benefits.

SUMMARY OF THE INVENTION

In some aspects, the present invention comprises a method of generating measurement information comprising receiving a plurality of 2D images including at least one building element of interest, wherein the images are generated from a single passive image capture device; at least a portion of the plurality of 2D images are overlapping with regard to the at least one building element of interest; and the at least one building element of interest comprises an actual measurement value. At least a portion of the images are processed using a 3D reconstruction process so as to generate a 3D digital representation of the at least one building element of interest. Measurements of the least one building element of interest from the 3D digital representation are then extracted and those measurements are processed provide one or more extracted measurement values for the at least one building element of interest. The extracted measurement values are within about 5% of each corresponding actual measurement value. Video cameras are suitably used to generate the overlapping images.

The measurement values generated herein can be used to generate takeoff information and construction estimations, as well as wireframe building images, CAD drawings, site plans, architectural drawings, building information models, scale drawings of a building or structure, landscape plans, interior design plans, inventory management plans, virtual tours etc.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
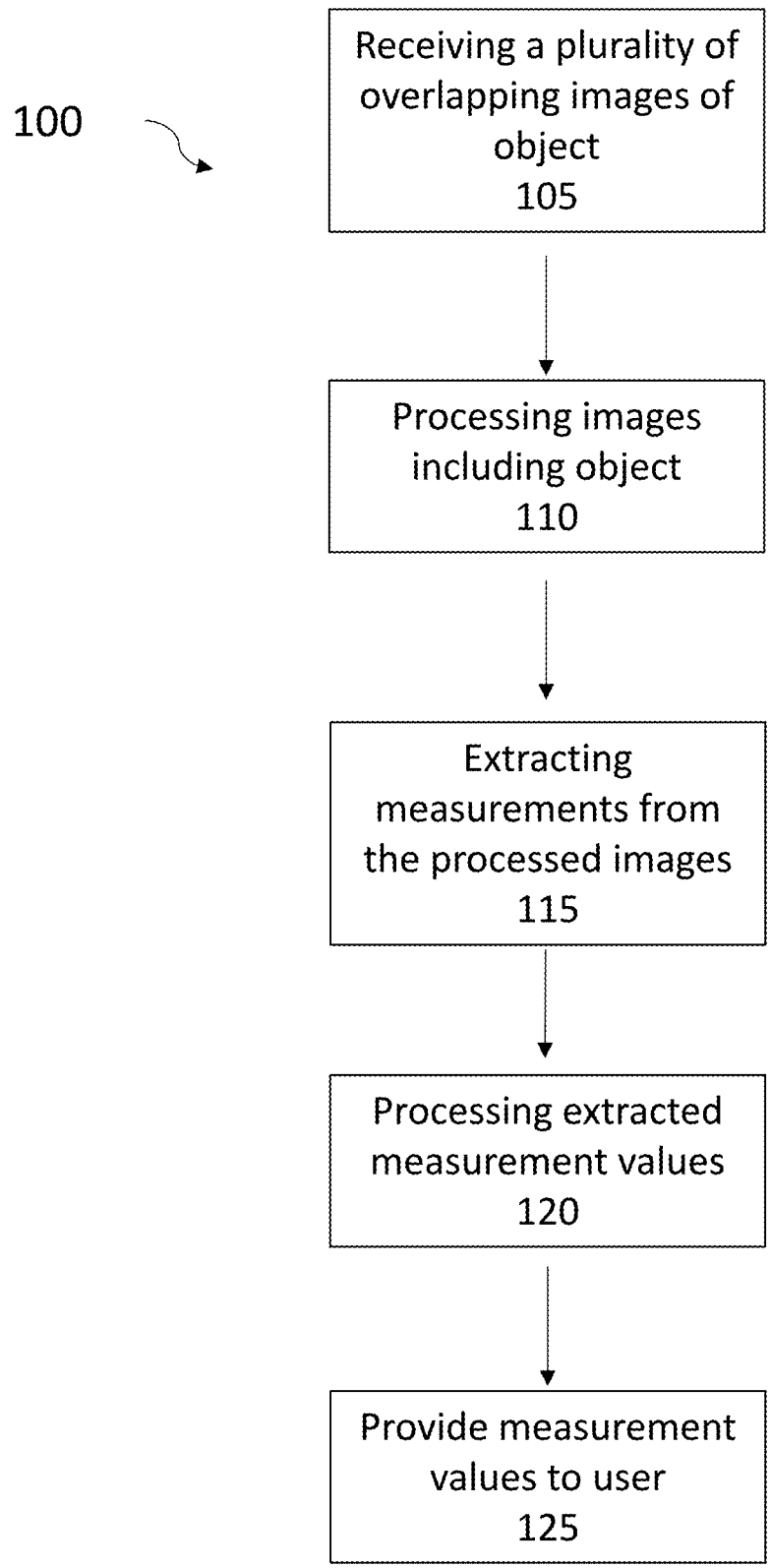
FIG. 1 shows an exemplary implementation of a process of the described inventive methodology.

In the following detailed description, reference is made to the accompanying drawings, which form a part hereof, and within which are shown by way of illustration certain embodiments by which the subject matter of this disclosure may be practiced. It is to be understood that other embodiments may be utilized and structural changes may be made without departing from the scope of the disclosure. In other words, illustrative embodiments and aspects are described below. But it will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

In one aspect, the present invention allows a user to generate accurate measurements about elements present in interior and exterior scenes from an image capture device. The interior and exterior scenes include at least one building element of interest. In broad constructs, the invention comprises receiving a plurality of 2D images, where the images comprise at least one building element of interest. The at least one building element of interest, which can comprise a variety of items as described in more detail hereinbelow, has an actual measurement value, that is, the measurement that would be generated according to a measurement with a tape measure or the like.

As used herein, a "building element of interest" encompasses a broad variety of objects that would be of interest in regards to measurements, amounts, and identities as set out in more detail herein. Such "building elements of interest" can be included in the interior of a building or structure or on the exterior thereof. One or a plurality of building elements of interest can be measured, quantified, or identified according the methodology herein.

The plurality of 2D overlapping images are processed so as to generated a 3D digital representation of the at least one building element of interest. Images from which the survey and measurement data of the present invention can be extracted or derived are generated and processed as set forth in co-pending application Ser. No. 14/826,104, filed Aug. 13, 2015 and now issued as U.S. Pat. No. 9,460,517 on Oct. 4, 2016, the disclosure of which is incorporated by reference in its entirety. In this regard, the plurality of images is generated from a single passive imaging device, and at least a portion of the plurality of 2D images are overlapping with regard to the at least one building element of interest. The plurality of overlapping images is processed using a 3D reconstruction process so as to generate a 3D digital representation of the at least one building element of interest. Measurements are extracted therefrom and the extracted measurement data is then processed to generate an extracted measurement value for the at least one building element of interest, wherein the extracted measurement value of the at least one building element of interest is accurate in relation to the actual measurement value of the element of interest.

As used herein, "passive" means that substantially no active signal source such as a laser or structured light (as opposed to camera flash or general-illumination devices) or sound or other reflective or responsive signal is utilized to obtain the images that are utilized in the interior survey of the present invention. Furthermore, images suitable for processing to provide the survey and measurement information can be generated from a single image capture device. Still further, the image capture devices of the present invention can include video image capture capabilities. In another aspect, images suitable for use in the interior survey devices and methods of the present invention are not generated from a device that uses active scanning techniques, such as a laser scanning device or by the addition of a specialized peripheral device that can be added to a smartphone, tablet, etc. In a further example, images suitable for processing in the methodology herein are not generated from a stereo image-capture device.

As used herein, "accurate measurements" means the measurements generated in the invention herein are within about 10%, or about 5% or about 3% or about 1% of the actual dimensions of the object(s) or scene elements present in the scene. For example, in a scene, the actual door opening measurements can be 84 inches on each vertical side and 36 inches on the upper and lower horizontal side. When the methodology of the present invention is used to generate measurements of the door opening, measurements derived from the images will be within about +/−8.4 inches in each vertical direction and within about +/−3.6 inches in each horizontal direction for an about 10% accuracy, or within about +/−3.2 inches in each vertical direction and within about +/−2.3 inches in each horizontal direction for an about 5% accuracy, or within about +/−2.8 inches in each vertical direction and within about +/−1.19 inches in each horizontal direction for an about 3% accuracy, or within about +/−0.84 inches in each vertical direction and within +/−0.36 inches in each horizontal direction for an about 1% accuracy.

In one aspect, the methodology herein can be used to capture information such as measurements, features, dimensions, quantity etc. while a user is on-site, that is, in the location where the at least one building element of interest is located, and such information can be returned quickly to the user for use thereof, such as for immediate or substantially immediate on site use in an environment. For example, a user can generate images of at least one building element of interest, and those images can be processed "in the cloud" and measurement information can be returned to the user for use. Alternatively, the information can be provided to a software program for additional uses, such as in takeoffs, construction estimation, site plan generation, inventory management, and the like, as discussed further herein.

In use, an image capture device, such as those mentioned previously, can be used to generate substantially overlapping images including the at least one building element of interest from which accurate measurements can be derived or extracted from the images. Measurements generated in accordance with the invention herein can include one or a plurality of lengths, heights, volumes, surface area etc. of the at least one building element of interest.

Scenes or locations from which survey and measurement information can be derived or extracted can include all or part of residential locations (e.g., houses, apartments etc.) and commercial/industrial facilities (e.g., office buildings, warehouses, factories, hospitals, hotels, universities etc.). Yet further, measurements of one or more elements of these interior or exterior scenes/locations can be extracted. In this regard, using the methodology herein measurements of at least one building element of interest can be derived. In a non-expansive listing, the at least one building element of interest can comprise a door, window, floor, stair and staircase, rooms (e.g., all or part of floor, walls and ceilings), fixtures (e.g., cabinets, countertops, shelving, merchandising components, furniture, appliances, HVAC, plumbing, outbuildings, etc.), landscaping (trees, hardscaping, fencing, decks), driveways and many others. Indeed, the variety of interior and exterior elements of interest that can be accurately measured with the methodology herein is expansive.

In significant aspects when the present invention is being applied to exterior surveying, the methodologies herein do not comprise aerial images of a location as described in U.S. Pat. No. 9,142,012, the disclosure of which is incorporated by reference. Yet further, the survey and measurement information generated by the methods of the present invention is generated from images that are not taken from imaging devices that are positioned above the location being imaged. Still further, the survey and measurement information generated by the methods of the present invention are provided by images taken by a user substantially at ground level or from a point substantially at or below the highest point of the structure being imaged. Yet further, images from which the measurements of the present invention are derived from images that are not generated from a drone, airplane or other device that can be used to take aerial images.

Moreover, unlike the methodology broadly described of US Patent Publication No. 2014/0270480, the disclosure of which is incorporated herein in its entirety by this reference, the present invention allows not just "estimation and calculation," as set forth in the '480 Publication. Instead, the methodology herein allows the generation of substantially accurate measurements of the at least one building element of interest. In this regard, the present invention provides an extracted measurement value for the at least one building element of interest, wherein the extracted measurement values are within about 5% or less of the actual measurement value for that building element of interest, or even within about 1% or less of the actual value.

The survey and measurement information of the present invention can be used in place of the traditional methods of generating survey and measurement information for generating takeoff information or other types of information useful in construction estimation (e.g., tape measures, laser scanners, surveying equipment). In this regard, the present invention provides methodologies to generate substantially accurate survey and measurement information of both interior and exterior locations for use to provide takeoff information or other types of construction estimation.

Notably, because the survey and measurement information generated by the methodology of the present invention provides a substantially accurate representation of the metes and bounds of interior and exterior locations substantially without the need for a trained person to visit the site, the methods of the present invention can significantly lower the cost of construction estimation, while still meeting or exceeding the accuracy obtained by use of a professional estimator. In some aspects, the methodology of the present invention can facilitate the automation of construction estimation because accurate measurements can be extracted directly from images taken of the fixtures and/or elements of a scene of interest.

The accurate surveying and measurement information provided by the methodology of the present invention has particular utility in generating quantity takeoff information in projects where existing structures or facilities are undergoing remodeling or replacement. Yet further, when the accurate surveying and measurement information of the present invention is used in conjunction with construction estimation software, accurate construction estimates can be provided.

As would be recognized, "takeoff" is the process of obtaining quantity measurements from plans and specifications. The process involves measuring items, elements, fixtures etc. and then performing calculations to arrive at the required quantities, such as lumber, construction components (e.g., doors and windows), amount of carpet needed to cover a floor etc. Estimating, on the other hand, is applying costs to these quantities. The quantity takeoff comprises a key component of an accurately prepared cost estimate. Estimated costs cannot be created without first knowing the quantities. Often, the quantity takeoff is the most time consuming activity in creating the estimate and the activity that is most subject to error and mistakes. By generating the surveying and measurement information directly from images of the building, location, structure or interior substantially without a physical measurement step, not only is accuracy improved, but time and costs are lessened.

As used herein, "construction estimating software" is a collection of programs, processes and information used to calculate the total cost of a construction project. Estimating software automates the information historically obtained using manual spreadsheets and calculators. Use of the accurate survey and measurement information from which suitably accurate measurements can be generated according to the methodology herein facilitates and improves the estimating process by increasing the speed and accuracy with which a construction estimate can be made. Estimating software, in general, improves a contractor's ability to compete with other bids and accurately represent the true cost of a project to potential clients, enhancing productivity and easing the bidding process. Construction estimating software is used in many different sectors of the construction industry. Different versions address specialized applications in commercial, industrial and residential construction, as well as general contracting, specialty contracting and highway or heavy contracting. Presently, there are a number of construction estimating software products available, and new ones are entering the market regularly. Measurements derived from the methodology of the present invention can be used in any of these products to generate quantity estimates and, optionally, costs for materials associated with a construction project plan.

In this regard, one aspect of the present invention comprises generating substantially accurate estimation of the cost of materials needed to complete one or more elements of a construction project. As used in this context, "substantially accurate" cost of materials is within about 10% or within about 5% or within about 3% of the actual cost of the materials. Of course, cost accuracy presupposes that accurate materials costs are available for use to calculate the material cost estimations. In this regard, the construction estimation software will be connected with a source of material cost information, as is known.

Accurate measurements of dimensions of objects, fixtures, structures, parts of structures etc. that can be used to derive substantially accurate material cost estimations are generated using a single passive image capture device and those measurements are inputted into a construction estimation software program, thereby generating an estimate of the cost of materials needed to complete at least part of the construction project. As such, the present invention provides significant utility for contractors, designers etc. in that the measurement/surveying step can be done virtually.

The survey and measurement information generated according to the methods of the present invention can be incorporated directly into construction estimator and/or construction project design software, such as that disclosed in U.S. Pat. No. 8,290,801, the disclosure of which is incorporated herein in its entirety. For example, the '801 patent provides a streamlined process for selecting materials to be used in a construction project, such as roofing shingles or other building materials. However, before costs can be provided for the materials chosen, measurements must be provided for use therein.

The survey and measurement information of the present invention generates the necessary data to provide quantity takeoffs and cost estimations from existing structures, facilities, landscapes, or interiors for which building information models ("BIM") or CAD or other computerized renderings or drawings that can contain measurement information do not yet exist for those structures, facilities, landscapes, or interiors. In this regard, the present invention has utility for remodeling projects. As such, the present invention presents improvements over the methodologies disclosed in U.S. Pat. No. 9,251,301 the disclosure of which is incorporated herein in its entirety. In this regard, the '301 patent describes semi-automating generating quantity takeoffs using CAD drawings. Such CAD drawings would have to be generated prior to creating of the takeoff information, which is likely why the process of that disclosure is only "semi-automated." If a BIM exists for the structure, facility or interior, survey and measurement information could be extracted for use to generate quantity takeoff information.

In some aspects, the present invention allows substantially accurate measurements to be extracted from a plurality of images of one or more elements present on or about at least one building element of interest, wherein the images are generated from a single passive image capture device, and wherein the measurements derived or extracted from the images are within about 10%, or about 5% or about 3% or about 1% of the actual measurements of the one or more elements present in the structure of interest. Such direct derivation or extraction of measurements from one or more elements of a building element of interest provides a significant improvement over prior art methodologies that require physical measurement of the one or more elements, laser scanning or the use of peripherals. In this regard, the measurements can automatically be derived or extracted directly from the images for use in providing takeoff information and/or for use in a construction estimation program. In some aspects, the extracted measurement value is generated directly from the 3D digital representation. The present invention provides significant benefits over the prior art because it does not require previously generated CAD drawings or building information models or other types of computerized drawings or renderings, so as to allow quantity takeoff information to be generated substantially automatically. Such functionality shows particular utility in applications where CAD, BIM or other computerized drawings or renderings may not exist, for example, when a building, site or landscape was designed and built prior to the proliferation of computerized techniques that are commonly used in recent years.

The various aspects of the invention can be carried out on a wide variety of devices that can generally be categorized by the term "passive image capture device." As used herein, such image capture devices in use today are integrated into mobile devices such as "smartphones," mobile telephones, "tablets," "wearable devices" (such as where a camera may be embedded or incorporated into clothing, eyeglasses or functional jewelry etc.), laptop computers etc. Still further, the image capture devices can be associated with (such as by being in communication with) desktop computers and cloud-based computers. It is contemplated that innovations in image capture devices will be introduced in the future. Such image capture devices are included in the present invention if these devices can be configured to incorporate the inventive methods herein.

In various aspects of the invention, all or some portion of the processes claimed herein can be carried out on a portable device that includes suitable processing capability. In recent years, there has been a proliferation of smartphones. Exemplary operating systems/smartphones are IOS/iPhone®, Android®/Samsung Galaxy® and Windows®/Windows Phone®). As would be recognized, smartphones are wireless, compact, hand-held devices that, in addition to basic cellular telephone functions, include a range of compact hardware. Typical smartphones have embedded (or "native") digital cameras that include both video and static image acquisition capabilities, large touchscreen displays, and broadband or Wi-Fi capabilities allowing for the receipt and transmission of large amounts of data to and from the Internet. More recently, tablet computers and wearable devices have emerged that provide, in pertinent part, many of the functionalities of smartphones, including image capture and processing capabilities and W-Fi and cellular capabilities.

Smartphones, tablets and wearable devices not only include a range of hardware, they are also configured to download and run a wide variety of software applications, commonly called "apps." The proliferation of mobile devices, with their combination of portable hardware and readily loaded software applications, creates a platform upon which many aspects of the invention may be practiced. A wide variety of apps can be generated to utilize information obtained from the inventive interior survey devices and methods.

In certain aspects, the devices and methods of the present invention advantageously utilize basic features of smartphones, tablets, and wearable devices, and extend the capabilities of these devices to include accurate and convenient measurement of an interior location by using the integrated image capture devices included by the manufacturers on such devices. In further aspects, the processes described herein may convert a common smartphone, tablet, wearable device, standalone camera etc. into a measurement tool, medical device or research tool, for example. Such aspects will benefit users by extending the functionality of these devices.

While use of multi-function smartphones, tablets, wearable devices, etc., that incorporate image capture devices suitably allow implementation of the methodology herein, devices that include less functionality, such as "stand-alone" digital cameras or video cameras, can also be used. Such image capture devices generally include W-Fi and/or cellular capabilities, as well as "apps" so as to provide networked functionality. Accordingly, such image capture devices can suitably be utilized in accordance with one or more of the inventions herein. One example of a standalone digital camera that can be used is the GoPro® H3.

In a further example, the methods herein can be performed on a single purpose device. For example, an image capture device intended for use by professionals who work with interior building spaces (e.g., architects, contractors, interior designers etc.) can be configured with hardware and software suitable to allow the users to obtain measurements that they can use in their respective professional responsibilities. Landscape designers can also benefit from such single purpose devices. In one regard, a device configured specifically to generate surveys and measurements of interior and locations using the inventive methods herein comprises an inventive survey device.

The images used to generate interior survey and measurement information according to the present invention can be processed using microprocessor capability native in the image capture device comprising the image capture capability or the images and associated data can be transmitted to a remote server (e.g., to the cloud) for processing outside of the device. The processing is provided, in one example, by software instructions conforming generally to the methods set out U.S. patent application Ser. No. 14/826,104, previously incorporated by reference. If the images are processed outside of the image capture device, such as on a remote server, the interior location survey and measurement information generated from the images can be returned to the user (e.g., provided on a smartphone or tablet or available for use on a PC etc.). For example, the survey and measurement information can be returned for use in one or more apps associated with the user's device. In one example, an app can use the survey and measurement information obtained from the processed images to provide takeoff information to a user. Alternatively, the survey and measurement information can be utilized for a variety of uses as discussed elsewhere herein.

In addition to takeoff information and construction estimates, the survey and measurement information derived from images obtained of structures having one or more elements of interest can be used to, for example, generate floorplans, interior and exterior design information, to provide information to insurance companies, for real estate marketing, 3D model generation, inventory management, landscapes and the like. In one or more of such aspects, the present invention allows one to obtain information regarding one or more of measurements, location, direction, fixtures (e.g., appliances, furniture, shelving, built-in cabinets etc.), floor, wall and ceiling dimensions, the presence or absence of doorways and windows, electrical and plumbing locations, property dimensions (e.g., television size etc.), as well as other information that can be derived from a survey of an interior scene or location. Aspects of commercial and residential interior scenes that can be suitably surveyed with the devices and methods of the present invention include in illustrative examples one or more of internal walls that are straight or curved, stairways, doors, windows, cutouts, holes, island areas, borders, insets, flooring and ceiling dimensions etc.

The surveying and measurement methods of the present invention can be utilized to obtain one or more floorplans associated with an interior location of interest where the at least one building element of interest may be located. As used herein, a "floorplan" is a drawing to scale of an interior location showing a view from above of the relationships between rooms, spaces and other physical features at one level of a structure. Dimensions can be drawn between the walls to specify room sizes and wall lengths. Floor plans may also include details of fixtures like sinks, water heaters, furnaces, manufacturing equipment etc. In this regard, apps or other software associated with the present invention can be configured to automatically import measurements and dimensions onto a floorplan generated herein. Floorplans can also include notes for construction to specify finishes, construction methods, or symbols for electrical items. The drawings obtainable from the devices and methods herein are equally suitable for printing to provide, for example, blueprints, or they can be made visible on a device screen for use in a non-paper environment.

Dimensional and other information obtained from the interior surveying devices and methods herein can be utilized in a variety of software-based applications in addition to the takeoff and construction estimation software discussed previously. In this regard, the information can be utilized to generate AutoCAD files that can be utilized to create, for example, 3D models of an interior location where such models may be used to generate architectural, construction, engineering, and other documentation related to a construction project. Even further, the interior survey and measurement information can be provided for use in DWG, DXF or STL formats. The rendering of the structures or elements of structures in such models are substantially accurate to scale in accordance with the accuracy of the measurements from which they are derived.

Yet further, the present invention provides benefits in construction project management. To this end, the devices and methods of the present invention facilitate management of inventory, management of construction elements, and can further enable a contractor or any other person involved in a design, building or construction capacity to rapidly perform engineering cost analyses while a project is underway, thus better allowing the effects of revisions and change orders on scheduling and project cost to be assessed.

In one example, the present invention can provide survey and measurement information for all or part of a flooring area in an interior location in which flooring materials are to be installed. That is, the surveys of the present invention can be used to provide information that can be used to generate flooring takeoffs suitable for defining the amount of flooring material needed to complete flooring project. As used herein, "flooring materials" are broadly defined to include carpet, carpet tile, ceramic tile, laminate flooring and similar materials. To illustrate use of one aspect of the present inventions, processing to provide flooring material takeoff information generally comprises the following steps that are needed in order for a bid to be provided: the manufacturer's representative or estimator, using the relevant interior survey and measurement information generated from the inventive interior surveying devices and methods herein selects for calculation one or more flooring components, calculates the number of components required and calculates the cost of the components. If the contract is awarded for the flooring, a parts list can also be generated for ordering and inventory management of the needed components. The present invention provides improvements in devices and methods to allow such flooring takeoffs to be obtained more quickly and easily and, in some aspects, the survey and measurement information obtained herein can provide more accurate information, thus leading to more accurate takeoff information obtainable therefrom. In particular, measurement and other pertinent dimensional information can be derived from the survey and measurement information generated according to the invention herein, thus providing improvements in flooring takeoff generation.

In addition to providing takeoff information regarding flooring materials, the inventive devices and methods can also be used to provide accurate information regarding one or more of carpet seam layout and manipulation, cut waste optimization, roll cut sheet manipulation, pattern carpet matching and tile pattern layout. For example, when used to match carpet patterns, a carpet section comprising a pattern can be overlaid onto a floorplan to allow a designer or installer to generate the most optimum placement of carpet sections. Such functionality can not only improve the aesthetic appearance of a final carpet installation, but waste from excess remnant generation can also be reduced.

A further inventive utility of the present invention is to prepare accurate representations of a collection of building elements present in a scene or at a location. In this regard, extracted measurement values can be generated for a plurality of building elements, thereby providing a plurality of extracted measurement values for a corresponding plurality of building elements. This information can then be used to derive one or more of wireframe building image, a CAD drawing, a site plan, scale drawing of structure, an architectural drawing, a landscape plan or an interior design plan.

As used herein, a "site plan" comprises an architectural plan that includes a detailed engineering drawing of proposed improvements to a given location. A site plan can illustrate a building footprint, roadways, parking, drainage facilities, sanitary sewer lines, water lines, trans, lighting, and landscaping. A site plan can also comprise a graphic representation of the arrangement of buildings, parking, drives, landscaping and any other structure that is part of a development project. A site plan can also comprise a set of construction drawings that a builder or contractor uses to make improvements to a property. Site plans are often prepared by a design consultant who must be either a licensed engineer, architect, landscape architect or land survey. The methodology of the present invention can be used to augment or streamline the work of, or in some aspects, to replace the need for one or more of these professionals.

A "building wireframe" is an illustration of a building (or other structure) that comprises lines and connections. A building wireframe can be used to generate a CAD drawing of the building or structure etc.

As used herein, a "floorplan" is a diagram that shows the relationships between rooms, spaces and other physical features at one level of a structure. Dimensions can be drawn between the wads to specify room sizes and wall lengths. Floor plans will also include details of fixtures like sinks, water heaters, furnaces, etc. Floor plans will include notes to specify finishes, construction methods, or symbols for electrical items.

"Architectural drawing" means a drawing generated according to a set of conventions, which include particular views (floor plan, section etc.), sheet sizes, units of measurement and scales, annotation and cross referencing. Similar to a map in a floor plan the orientation of the view is downward from above, but unlike a conventional map, a plan is understood to be drawn. An architectural drawing can of the interior (doors, windows, fixtures, plumbing, electrical etc.), exterior (doors, windows, walkways, fixtures, etc.) or both.

"Landscape design plan" is a rendering of plans related to exterior landscape features, such as shrubs, trees, grass, general horticultural features, hardscapes and the like.

"Interior design plan" plan is a rendering of plans related to interior landscape features, such as fixtures, furniture, paint attributes, carpeting, pictures and the like.

As a further example of uses for the measurement and survey information of the present invention, virtual tours can be obtained from the survey and measurement information generated from image processing as described elsewhere herein. Virtual tours can provide a way for a user to view different parts of a physical location or site from different perspectives and in different directions. As would be recognized, such virtual tours can be useful in many different contexts where it may be advantageous for a user remotely to see a physical site from different angles and points of view. Examples of physical sites that can be presented in a virtual tour of an interior location include: a house or other property for sale; a hotel room or cruise ship stateroom; a museum, art gallery, or other sightseeing destination, a factory or facility plant for training purposes or the like.

When combined with the ability to convey accurate dimensions of the interior location, the value of a virtual tour can be greatly improved. For example, when applied in a real estate marketing context, the survey and measurement information provided by the survey and measurement of the present invention can allow a potential buyer or renter to see the actual dimensions of a room to determine whether her furniture or other fixtures will fit. In further aspects, the ability to obtain accurate dimensions of interior scenes from the surveying devices and methods of the present invention can allow a user to overlay pictures of furniture etc. that she wishes to buy onto a floorplan or even an actual image of the room to make sure the furniture will fit prior to making a purchase.

Yet further, the survey and measurement information of the present invention can be utilized to generate information useful for insurance underwriting and/or for claims adjustment. For example, when a destructive event occurs, such as a fire, it can be difficult for an insurance adjuster to validate the insured's representations of the condition and value of the interior of a building prior to the event. In this regard, an insurance company can obtain a floor plan, virtual tour or the like of an insured's house or facility as a requirement for underwriting a policy or by providing a discount to an existing policy holder. An insurance company may also be interested in obtaining takeoff information and, as mentioned previously, such information is obtainable from the devices and methods herein. Because the interior survey functionality of the present invention provides substantially accurate dimensions of an interior location to be acquired, along with those of any fixtures incorporated therewith, an insurance company that obtains such a survey prior to an occurrence of a destructive event that results in a claim event can better ensure that the information provided by the insured accurately matches the conditions of the location existing prior to the destructive event.

3D models of interior and exterior locations can further be derived from the survey and measurement information obtained using the presently described inventions. Besides applicability to virtual tours as described elsewhere herein, such 3D models can be utilized to provide users with an immersive experience regarding a remote location. For example, a 3D model of an airplane interior can allow a potential traveler to understand how much legroom he will have on a flight. Such 3D models can also allow a user to remotely travel to a store to generate an improved online shopping experience. Yet further, 3D models obtained from the interior and survey information of the present invention can be used to provide immersive learning experiences for remote training or the like.

In a further aspect, the present invention can be used to provide information related to inventories of fixtures or equipment or stock present in a warehouse or storage facility-setting. For example, images can be generated in such locations from which the number of items present can be derived using the survey and measurement information obtained from the images. When such images are obtained from image capture devices present in a warehouse or other type facility, real time inventory management information can be obtained and the present invention has utility in security applications and the like. In this regard, the extracted measurement information obtained herein can be used to confirm whether the expected quantity of inventoried product is present as would be expected by comparison with inventory information associated with the product of interest. When combined with information about the identity of the products etc. that are stored in such locations, the extracted measurements can be used to generate accurate lists of products present in a warehouse or related facility. For example, a measurement information can be generated from images for a plurality of objects, where the objects can be the same or different, and inventories can be generated therefrom.

The surveying devices and methods of the present invention can further be used to derive information related to the size and dimensions of objects that may be present in a building environment. For example, the size and volume of boxes individually or a collection of boxes can be provided, where such measurements are accurate as set out further herein.

Yet further, the survey and measurement information derived from images generated and processed according to the present invention can be compared to information obtained from a library of image information stored or otherwise obtainable by a user. In another aspect, a database of common objects present in a construction or contractor setting can be included in apps or other software implementations directed toward such users. When information obtained from items present in the standard library is used along with information obtained from the images generated from the interior survey devices and methods of the present invention, the presence or absence of such standard items can be determined. For example, if the interior survey provides information that an object with a size of 4.5 inches (11.42 cm) in height and 2.75 inches (6.985 cm) in width is present in an interior scene, associated software can return information to the user that the object in the scene is, in high likelihood, a standard US toggle switch plate. Such information can allow a user easily to obtain information regarding the number and location of light switches in an interior location from images. Still further, the library of image data associated with the interior survey inventions herein can be included in software configurations directed toward interior decorators, facilities designers, project managers or the like.

The devices and methods of the present invention can be used further to generate information regarding interior and exterior locations relating to the presence or absence of required fixtures or equipment. In this regard, the at least one building element of interest will be a piece of equipment that is required-by regulation, process controls or otherwise, to be present in the location. For example, an interior survey can be conducted with the devices and methods of the present invention to determine whether a required piece of safety equipment is actually present in a location. In an example of this, many locations require the presence of defibrillators or other safety equipment in a prescribed number and in certain locations. The devices and methods of the present invention can be used to obtain surveys of such interior locations. Because the required equipment will have a known size and required orientation in a room, survey and measurement information obtained from the devices and information of the present invention can be used to determine whether the required equipment—a defibrillator in this example—is present.

Yet further, the devices and methods of the present invention can be used to determine whether a facility or other location complies with the Americans with Disabilities Act or other types of government regulations where interior locations are required to have fixtures of a certain configuration. In this regard, survey and measurement information obtained according to the present invention can allow determination of whether doorways are suitably wide, ramps are present, etc.

The survey and measurement information of the present invention also can have utility for forensic science applications. For example, the devices and methods herein can be used for documenting a crime scene and can provide a capability to make subsequent measurements using captured floor plan and image data for use as evidence. The ability of an investigator to obtain accurate measurements from the actual images taken in a crime scene can greatly enhance the evidentiary quality of information obtained from the crime scene.

The survey and measurement information generated herein can also be used to conduct ground level survey and measurement information. The types of survey and measurement information obtainable using the inventive methodology are varied. For example, the inventive devices and methodology can be used to generate one or more of construction surveys, as-built surveys, to generate exterior fixture and equipment inventories, landscaping plans and the like.

The survey and measurement information of the present invention also can be used in any application in which surveys that capture accurate measurements of interior scenes are desired, where such accurate measurements are generated from images derived from image capture devices as described elsewhere herein.

Referring to FIG. 1, process 100 comprises step 105 in which a plurality of overlapping images of at least one building element of interest (not shown), that is, at least one building element of interest, are received for processing 110. Measurements are extracted from the processed images to provide extracted measurement values in step 115, followed by processing of the extracted measurements 120 and providing of measurement values to the user in step 125. Such measurement values can be used as set out elsewhere herein.

EXAMPLES

Figure 2:
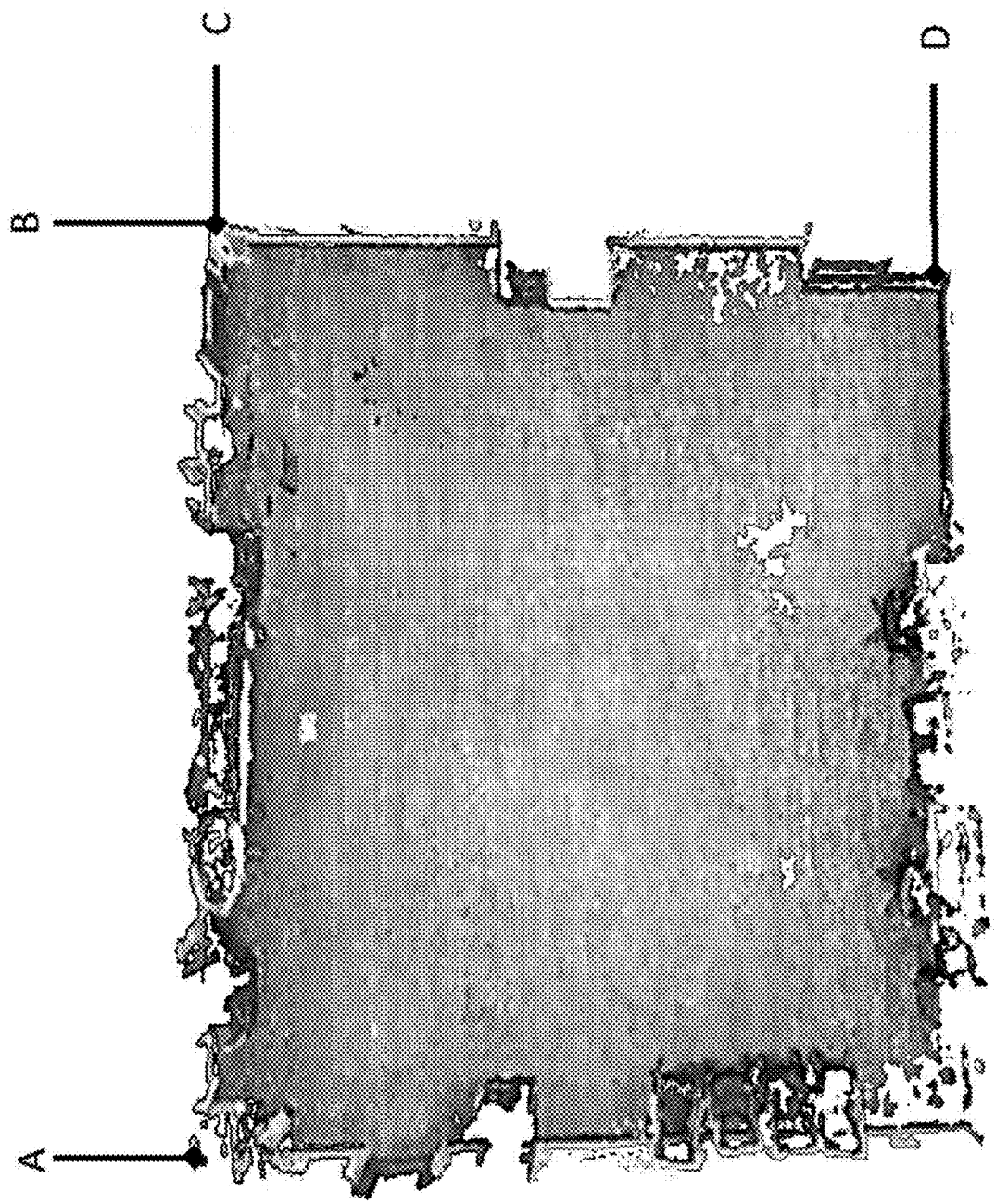
FIG. 2 illustrates an extracted measurement value for a room measured according to an implementation of the present invention.
Figure 3:
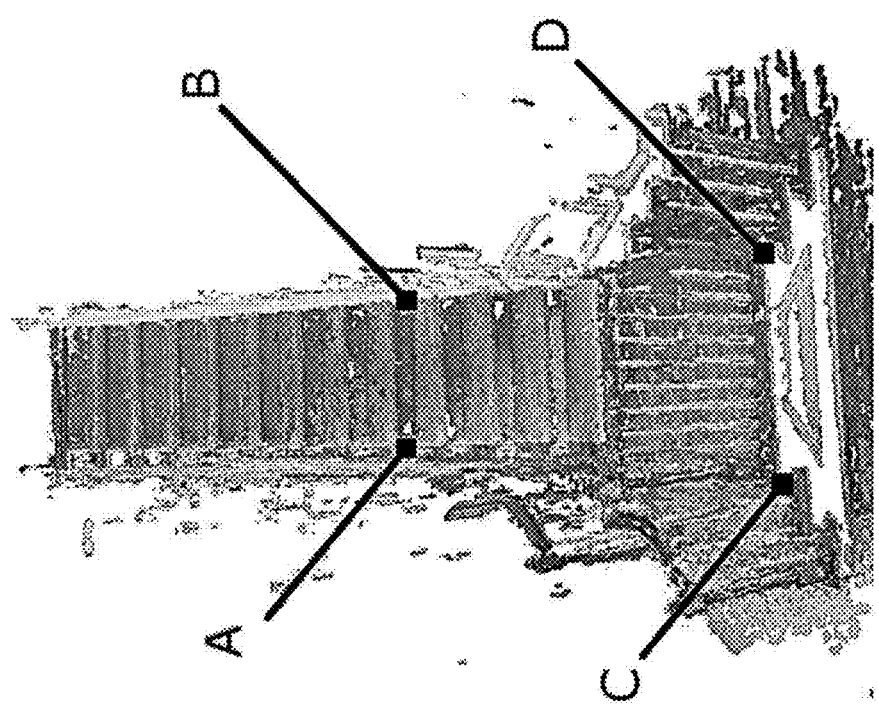
FIG. 3 illustrates extracted measurement values for various aspects of a staircase measured according to an implementation of the present invention.
Figure 4:
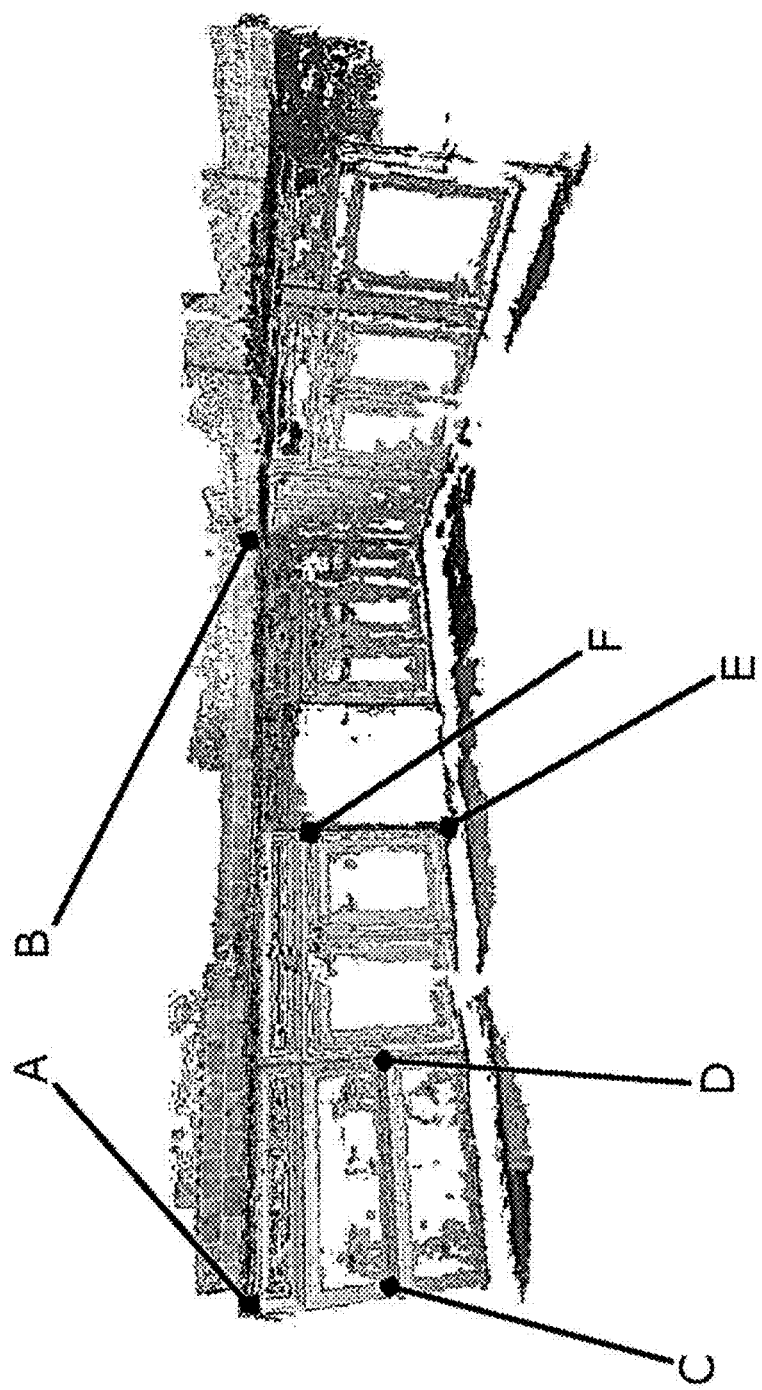
FIG. 4 illustrates extracted measurement value for a various aspects of a kitchen measured according to an implementation of the present invention.

Videos of various scenes were generated from an iPhone® 5S (Apple Corporation, Cupertino, Calif.) were generated and processed according to the methodology herein. FIGS. 2-4 herewith are image renderings generated with the measurement areas called out for description herein. The image renderings in FIGS. 2-4 are intended to be illustrative of the location and accuracy of the survey and measurement information that can be generated in accordance with the invention.

Example 1

The imaging device was used to generate video images of a floor using in the methodology of the present invention. As shown in FIG. 2, measurements for the room of 20 feet 6 inches and 18 feet 7.5 inches were generated, which is illustrated at the endpoints of A and B and C and D, respectively. These measurements were within 1% of the actual measurements for the room when measured using a tape measure. These accurate measurements were suitable for use to generate flooring takeoff information for use by a flooring contractor.

Example 2

Videos were taken with the imaging device of a staircase in a home. As shown in FIG. 3, a width of 42 inches was generated on the staircase at shown by the endpoints of A and B, and a width of 48 inches was returned for the bottom of the staircase, as shown by the endpoints of C and D. These measurements were within 1% of the actual measurements for the staircase when measured using a tape measure. These measurements were suitable for use by a remodeling contractor.

Example 3

Videos were taken with the imaging device of a kitchen in a home. As shown in FIG. 4, various measurements were returned for this location including 12 feet 6 inches for a countertop length (as shown by the endpoints of A and B), 30 inches for a drawer width, (as shown by the endpoints of C and D), and 33 inches for a countertop height (as shown by the endpoints of E and F). These measurements were within 1% of the actual measurements for these kitchen locations when measured using a tape measure. This collection of measurements was suitable for use to develop plans for a kitchen remodeling project.

Communication media appropriate for use in or with the inventions of the present invention may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present invention are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein 1 may include both local non-transient storage media and remote non-transient storage media connected to the information processors using communication media such as the internet. Non-transient computer-readable media do not include mere signals or modulated carrier waves, but include the storage media that form the source for such signals.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably coupleable", to each other to achieve the desired functionality. Specific examples of operably coupleable include but are not limited to physically mateable and/or physically interacting components and/or wirelessly interactable and/or wirelessly interacting components and/or logically interacting and/or logically interactable components.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

Any US patents and Patent Applications referred to herein including co-pending application Ser. No. 14/826,104, filed Aug. 13, 2015, and co-pending application Ser. No. 14/826,113, filed Aug. 13, 2015, are hereby incorporated by reference in their entireties by this reference.

What is claimed is:

1. A method of generating accurate measurement information for a structure including a building element of interest, the method comprising:
   a) selecting a structure including one or more building elements;
   b) identifying at least one building element in the structure, thereby providing at least one building element of interest;
   c) obtaining a plurality of two-dimensional (2D) images including the at least one building element of interest, where:
      i) the plurality of 2D images are generated using a single passive image capture device;
      ii) at least a portion of the plurality of 2D images are overlapping with regard to the at least one building element of interest;
      iii) the plurality of 2D images are generated by a user substantially from a point point of the structure; and
      iv) the at least one building element of interest comprises one or more actual dimensions of the at least one building element of interest;
   d) processing at least a portion of the overlapping 2D images that include the at least one building element of interest to derive a three-dimensional (3D) digital representation of the at least one building element of interest; and
   e) extracting measurement data for the at least one building element of interest directly from the 3D digital representation, thereby providing one or more measurement values for the at least one building element of interest, where a difference between each of the one or more provided measurement values of the at least one building element of interest and a corresponding actual dimension of the at least one building element of interest is, independently, less than 1% of the corresponding actual dimension for the at least one building element of interest.

2. The method of claim 1, wherein the one or more measurement values are extracted for a plurality of building elements of interest, thereby generating a plurality of extracted measurement values.

3. The method of claim 2, wherein the plurality of extracted measurement values are used to generate one or more of a wireframe building image, a CAD drawing, a site plan, an architectural drawing, a building information model, a scale drawing of a building, a landscape plan, or an interior design plan.

4. The method of claim 1, further comprising generating takeoff information from the one or more extracted measurement values.

5. The method of claim 1, wherein the single passive image capture device is a video camera.

6. The method of claim 1, wherein the one or more extracted measurement values are not first generated from a wireframe building image, a CAD drawing, a site plan, an architectural drawing, a building information model, a scale drawing of a building, a landscape plan, or an interior design plan.

7. The method of claim 1, wherein the at least one building element of interest is present in a substantially interior location of the structure, and comprises one or more of a room, a floor, a staircase, a wall, a doorway or a window.

8. The method of claim 1, wherein the at least one building element of interest is present in a substantially exterior location, and comprises a one or more of a building, a roof, a doorway, a window, a yard, a landscape area, a driveway, or a fence.

9. The method of claim 1, further comprising inputting the one or more extracted measurement values into construction estimation software, thereby providing a construction estimate.

10. The method of claim 1, further comprising providing an identification of the at least one building element of interest based upon the one or more extracted measurement values.

11. The method of claim 1, wherein the generated measurements include one or a plurality of length, height, volume, or surface area for the at least one building element of interest.

12. A system for generating accurate measurement information for a structure including a building element of interest, the system comprising:
   an imaging device configured to obtain a plurality of two-dimensional (2D) images including at least one building element of interest of a structure, the at least one building element of interest selected from one or more building elements of the structure, where:
      i) the plurality of 2D images are generated using a single passive image capture device;
      ii) at least a portion of the plurality of 2D images are overlapping with regard to the at least one building element of interest;
      iii) the plurality of 2D images are generated by a user substantially from a the structure; and
      iv) the at least one building element of interest comprises one or more actual dimensions of the at least one building element of interest; and
   processing circuitry comprising a processor, the processing circuitry configured to:
      process at least a portion of the overlapping 2D images that include the at least one building element of interest to derive a three-dimensional (3D) digital representation of the at least one building element of interest; and
      extract measurement data for the at least one building element of interest directly from the 3D digital representation, thereby providing one or more measurement values for the at least one building element of interest, where a difference between each of the one or more provided measurement values of the at least one building element of interest and a corresponding actual dimension of the at least one building element of interest is, independently, less than 1% of the corresponding actual dimension for the at least one building element of interest.

* * * * *